United States Patent
Pikel

(10) Patent No.: US 6,626,704 B1
(45) Date of Patent: Sep. 30, 2003

(54) ACOUSTIC ADAPTER DEVICE

(76) Inventor: Daniel Pikel, 2425 Adelia La., West Chicago, IL (US) 60185

( * ) Notice: Subject to any disclaimer, the term of this patent is extended or adjusted under 35 U.S.C. 154(b) by 0 days.

(21) Appl. No.: 10/131,885

(22) Filed: Apr. 25, 2002

(51) Int. Cl.⁷ .............................................. H01R 25/00
(52) U.S. Cl. ........................ 439/638; 381/189; 381/74
(58) Field of Search .................. 439/638, 639–655; 381/74, 189

(56) References Cited

U.S. PATENT DOCUMENTS

| | | | | |
|---|---|---|---|---|
| 1,673,644 A | * | 6/1928 | Shoe | 439/454 |
| 4,145,566 A | * | 3/1979 | Weingartner | 174/65 R |
| 4,355,213 A | * | 10/1982 | Marsh | 381/363 |
| 4,647,135 A | * | 3/1987 | Reinhardt | 439/460 |
| 4,944,016 A | * | 7/1990 | Christian | 381/74 |
| 5,176,535 A | * | 1/1993 | Redmond et al. | 439/495 |
| 5,368,502 A | * | 11/1994 | Lin | 439/462 |
| 5,633,942 A | * | 5/1997 | Terng | 381/361 |
| 5,666,267 A | * | 9/1997 | Carter et al. | 361/686 |
| 5,740,261 A | * | 4/1998 | Loeppert et al. | 381/355 |
| 5,775,939 A | * | 7/1998 | Brown | 439/502 |
| 5,812,683 A | * | 9/1998 | Parker et al. | 381/74 |
| 5,820,414 A | * | 10/1998 | Omori | 439/638 |
| 6,210,212 B1 | * | 4/2001 | Niece | 439/502 |

* cited by examiner

Primary Examiner—Gary Paumen
Assistant Examiner—James R. Harvey
(74) Attorney, Agent, or Firm—Michael I. Kroll

(57) ABSTRACT

The present invention 10 discloses a body 17 which incorporates a 3.5 mm stereo "male" connector 18 with an integral microphone 20 and a 3.5 mm stereo "female" connector input 22. This combination adapter allows the user 14 to plug into a line-in input port 26, enabling the use of a microphone 20 and providing additional means to connect another line-in connection through the 3.5 mm female connector 22. The present invention 10 is particularly useful when used in conjunction with a personal laptop computer 12.

12 Claims, 12 Drawing Sheets

ACOUSTIC ADAPTER DEVICE

BACKGROUND OF THE INVENTION

1. Field of the Invention

The present invention relates generally to acoustic devices and, more specifically, to acoustic adapter devices for use with personal computers and other electronic devices with a line-in input.

The present invention incorporates a 3.5 mm stereo male connector with an integral microphone and a 3.5 mm stereo female connector input. This combination adapter allows the user to plug into a line-in input device, enabling the use of a microphone and provide means to connect another line-in connection through the 3.5 mm female connector.

The present invention is particularly useful when used in conjunction with a personnel laptop computer. This combination adapter allows the user to plug into the line-in port providing means to transmit audio though the microphone while maintaining the ability to connect to another line-in device through the female connector.

The user may adjust the microphone level after plugging the microphone into the 3.5 mm stereo line-in port of the device. In addition, the user can turn down the volume of the internal speakers to prevent feedback with the microphone.

With the relatively small ridged housing, cordless structure, and simple plug-in jack style connectors of the present invention, the user can record meetings and lectures without disrupting the proceeding. The additional port also provides the user advantages over non-users in that the non-users are not able to record while using the line-in port.

The present invention 3.5 mm female input and microphone also provides the user means for video conferencing over the internet. In addition, the acoustic adapter device can be used to mix in audio while recoding video and or audio from another device.

2. Description of the Prior Art

There are other acoustic adapter devices. Typical of these is U.S. Pat. No. 1,673,644 issued to W. W. Shoe on Jun. 12, 1928.

Another patent was issued to Bernhard Weingartner on Mar. 20, 1979 as U.S. Pat. No. 4,145,566. Yet another U.S. Pat. No. 4,355,213 was issued to Richard E Marsh on Oct. 19, 1982 and still yet another was issued on Mar. 3, 1987 to Chrys J. Reinhardt as U.S. Pat. No. 4,647,135.

Another patent was issued to David E. Christian on Jul. 24, 1990 as U.S. Pat. No. 4,944,016. Yet another U.S. Pat. No. 5,176,536 was issued to Robert P Ganger on Jan. 5, 1993. Another was issued to Jia S. Lin on Nov. 29, 1994 as U.S. Pat. No. 5,368,502 and still yet another was issued on Sep. 9, 1997 to Bill W. Carter as U.S. Pat. No. 5,666,267.

Another patent was issued to Jay Terng on May 27, 1997 as U.S. Pat. No. 5,633,942. Yet another U.S. Pat. No. 5,740,261 was issued to Peter V. Loeppert on Apr. 14, 1998. Another was issued to Thomas F. Parker on Sept. 22, 1998 as U.S. Pat. No. 5,812,683 and still yet another was issued on Apr. 3, 2001 to Timothy Niece as U.S. Pat. No. 6,210,212.

U.S. Pat. No. 1,673,644

Inventor: W. W. Shoe

Issued: Jun. 12, 1928

The invention relates to electric switches of plug and socket type. The object is to provide improved means cooperating with movable element of the switch and the conducting wires normally to prevent the separation of the wires from the said element. The chief purpose of this invention is to provide means for preventing any strain upon said connection between the wire and binding post, when the pull is exerted directly upon the cord, instead of hand piece. The invention also comprises improved means for securing the hand piece or body to the movable element and improved means for securing the hand piece and movable element to the cable independently of the connection of the wires to the binding post.

U.S. Pat. Number 4,145,566

Inventor: Bernhard Weingartner

Issued: Mar. 20, 1979

A housing for an electric plug or the like is formed with an axial bore which tapers toward an inlet opening. A pressure member received in the bore for movement toward and away from the inlet opening in conforming engagement with the housing has a face which radially approaches a counter face in the bore for clamping a cable therebetween during axial movement of the pressure member toward the inlet opening. A tubular clamping member, substantially coaxial with the bore of the housing, carries threads matingly engaging threads on the pressure member about the axis. An abutment of the clamping member engages an external rim portion of the housing about the inlet opening and limits threaded movement of the clamping member inward of the bore, whereby the pressure member is moved axially toward the inlet opening, and a cable passing through the tubular clamping member into the bore of the housing is clamped between the face of the pressure member and the counter face.

U.S. Pat. Number 4,355,213

Inventor: Richard E Marsh

Issued: Oct. 19, 1982

A microphone mounting assembly including an elongated tubing, having a mounting flange including a channel for adjustable receiving said tubing, and sand sealingly received in said tubing for providing acoustic-dampening characteristics.

U.S. Pat. No. 4,647,135

Inventor: Chrys J. Reinhardt.

Issued: Mar. 3, 1987

A generally tubular plastic collet, which is mounted coaxially in the bore of a rigid, tubular housing, has on one end thereof a plurality of radially flexible jaws that surround one end of an electrical cord that extends into the housing bore at one end thereof. A metal tip has an externally threaded shank that is adjustably threaded into the opposite end of the housing bore, and an elongate stem portion which projects to the exterior of the housing. The tip comprises a pair of coaxially disposed conductors insulated from each other in a conventional manner, and connected in the housing to a pair of wire conductors that project from the cord. The threaded end of the tip engages and urges the collet axially toward the inlet end of the housing, thereby flexing the collet jaws radially inwardly into gripping engagement with the cord.

U.S. Pat. No. 4,944,016

Inventor: David E. Christian

Issued: Jul. 24, 1990

This invention relates to a musical instrument amplifier which is particularly useful for electric guitars. The amplifier has a rigid body for housing both the electronic system for amplifying and processing signals from the guitar and the system's power supply. An input plug connected to and projecting from the body is electrically coupled to the signal amplifying and processing system. When the plug is inserted into an output jack for an electric guitar, the body is rigidly carried by the guitar, and the guitar is operatively connected to the electrical amplifying and signal processing system without use of a loose interconnection cable. The amplifier is provided with an output jack, into which headphones are plugged to receive amplified signals from the guitar. By eliminating the conventional interconnection cable, the amplifier of the present invention can be used by musicians with increased flexibility and greater freedom of movement.

U.S. Pat. No. 5,176,536

Inventor: Robert P Ganger

Issued: Jan. 5, 1993

An angle connected phone plug for connection to a coaxial electrical cable without screws or other mechanisms includes a tip and wire assembly, a housing assembly and a terminal assembly all disposed coaxially along longitudinal axis of phone plug and a substantially cylindrically shaped barrel having its own longitudinal axis along which coaxial electrical cable enters phone plug. The housing assembly includes a housing base and a mating housing cap which when mated present a threaded neck at an angle to longitudinal axis Barrel is coupled to threaded neck thereby securing the housing assembly closed.

U.S. Pat. Number 5,368,502

Inventor: Jia S. Lin

Issued: Nov. 29, 1994

A plug-in microphone connector which includes a connector member, a connector housing engaging with the connector member by a female thread and a male thread to compress a cable put through the connector member and a cable pincher so that the cable bends a little along a curved surface of the cable pincher to be sufficiently pinched therein to prevent separation of the cable from the connector member.

U.S. Pat. No. 5,666,267

Inventor: Bill W. Carter

Issued: Sep. 9, 1997

An audio I/O connector, a flex cable, an audio I/O extension card, a mounting bracket, and a besel, designed to couple and complement each other in a particular geometrical manner, are provided to conduct I/O of audio signals at the front panel area of a Baby-AT/LPX and the like system unit previously sealing the hard drive bay. The audio I/O connector reorients an otherwise conventional audio add-in/ adapter card to conduct I/O of audio signals through the frontal portion of the Baby-AT/LPX and the like system unit. The flex cable transports the audio V/O signals to and from the front and back portions of the Baby-AT/LPX and the like system unit. The audio I/O extension card facilities conduct of audio I/O with external audio devices at the front panel, the aforementioned area in particular. The mounting bracket secures the audio I/O extension card to the hard drive bay. The besel exposes audio I/O ports of the audio I/O extension card at the front panel area of interest.

U.S. Pat. No. 5,633,942

Inventor: Jay Terng

Issued: May 27, 1997

A microphone mounting structure including a keyboard having defining a horizontal bottom chamber near the rear side and a plurality of equally spaced vertical locating grooves inside the horizontal bottom chamber, a slide carrier slidably mounted in the horizontal bottom chamber of the keyboard, the slide carrier having a pair of vertical locating ribs detachably forced into engagement with the vertical locating grooves of the keyboard, and a supporting block at the front side, the supporting block having a microphone holder mounting hole and two locating holes spaced at an angle around the microphone holder mounting hole, a microphone holder having a mounting rod coupled to the microphone holder mounting hole of the supporting block of the slide carrier, a locating rib forced into engagement with one locating hole of the supporting block of the slide carrier, and a plug hole spaced from the mounting rod at right angles, and a microphone mounted in the plug hole of the microphone holder.

U.S. Pat. No. 5,740,261

Inventor: Peter V. Loeppert Issued: Apr. 14, 1998

A housing for shielding a transducer of the type mounted on a silicon die attached to a flexible circuit. The housing provides a jacket which protects the silicon die from physical damage. The jacket, in cooperation with the top and bottom cups, further provides a shield for the silicon die from light and electromagnetic interferences. An acoustic port located on the top portion of the jacket furnishes the means by which acoustic energy enters the jacket to contact the transducer. A back cavity, formed between the bottom cup and the silicon die, serves as the acoustic pressure reference which allows the microphone to function properly.

U.S. Pat. No. 5,812,683

Inventor: Thomas F. Parker

Issued: Sep. 22, 1998

A headphone jack extended outlet which amplifies and splits the output signal from a single conventional headphone jack to power multiple headphone jacks. The extended outlet includes a conventional headphone plug that inserts directly into the headphone jack of a sound system and includes a multiple headphone jacks for powering multiple headsets. The extended outlet further includes circuitry which amplifies the output signal received from the sound system to a level sufficient to power multiple headsets.

U.S. Pat. No. 6,210,212

Inventor: Timothy Niece

Issued: Apr. 3, 2001

A computer headphone extension device for connection to the audio output port on the rear of the personal computer and for connection to a stereo mini-plug of a headphone set. The computer headphone extension device includes an elongated electrical cord having a first end and second end. The computer headphone extension device further includes a phone jack member connected to the first end of the electrical cord for inserting the stereo mini-plug into the audio output port on the rear of the personal computer; and a receiving box device having a connecting port for connecting to the second end of the electrical cord and having a phone jack for receiving the stereo mini-plug of the headphone set.

While these acoustic adapter devices may be suitable for the purposes for which they were designed, they would not be as suitable for the purposes of the present invention, as hereinafter described.

SUMMARY OF THE PRESENT INVENTION

The present invention discloses a device which incorporates a 3.5 mm stereo "male" connector with an integral microphone and a 3.5 mm stereo "female" connector input. This combination adapter allows the user to plug into a line-in input port, enabling the use of a microphone and additionally providing means to connect another line-in connection through the 3.5 mm female connector. The present invention is particularly useful when used in conjunction with a personal laptop computer.

A primary object of the present invention is to provide an acoustic adapter that mates a 3.5 mm line-in port, includes an integral microphone and a 3.5 mm female connector.

Another object of the present invention is to provide means to utilize a microphone while maintaining the ability to use the same line-in port for another device.

One other object of the present invention is to provide means to record a discussion or lecture without disrupting others with cumbersome setup.

Yet another object of the present invention is to provide means to record a discussion or lecture without obvious presence.

Still yet another object of the present invention is to provide means to video conference over the internet, if the video device does not have a microphone.

Another object of the present invention is to provide means to record audio while transferring video from one device to another.

Another object of the present invention is to provide means to mix audio while transferring audio from one device to another.

Yet another object of the present invention is to provide a cordless microphone for use with personal computers and other devices.

Still yet another object of the present invention s to provide cost efficient easy to use acoustic adapter for use with computers and other devices.

Additional objects of the present invention will appear as the description proceeds.

The present invention overcomes the shortcomings of the prior art by providing means to add a microphone while maintaining an accessible 3.5 mm line-in port. In addition, the present invention overcomes the shortcomings of the prior art by providing a cordless microphone that is easily prepared for recording meetings or lectures.

To the accomplishment of the above and related objects, this invention may be embodied in the form illustrated in the accompanying drawings, attention being called to the fact, however, that the drawings are illustrative only, and that changes may be made in the specific construction illustrated and described within the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

Figure 1:
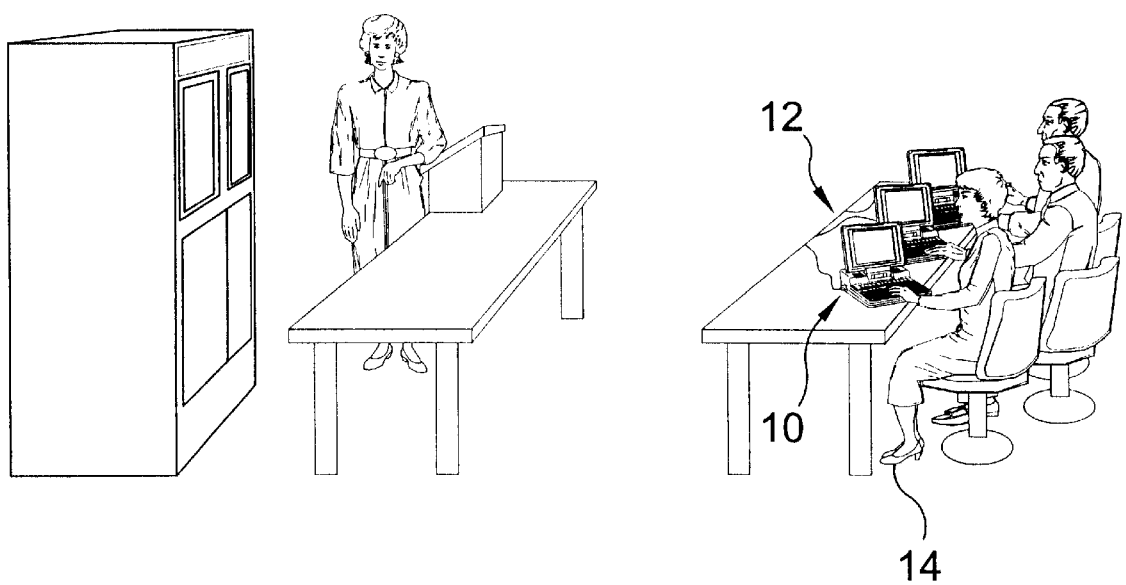
FIG. 1 is a perspective view of the present invention in use.

With regard to reference numerals used, the following numbering is used throughout the drawings.

10 present invention
12 computer
14 user
16 conventional microphone
17 body
18 male connector
20 microphone
22 female connector
24 remote computer
26 line-in port
28 additional equipment

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning to FIG. 1, shown therein is a perspective view of the present invention 10 in use. Shown is the present invention 10, a 3.5 mm stereo male connector with integral microphone and 3.5 mm stereo female connector input, being utilized to record a meeting. By utilizing the present invention, the user 14 is able to add a microphone to the laptop computer 12 without losing the line-in port. The user 14 has an advantage over the other meeting participants that can only utilize the one line-in input available on their laptop computer.

Figure 2:
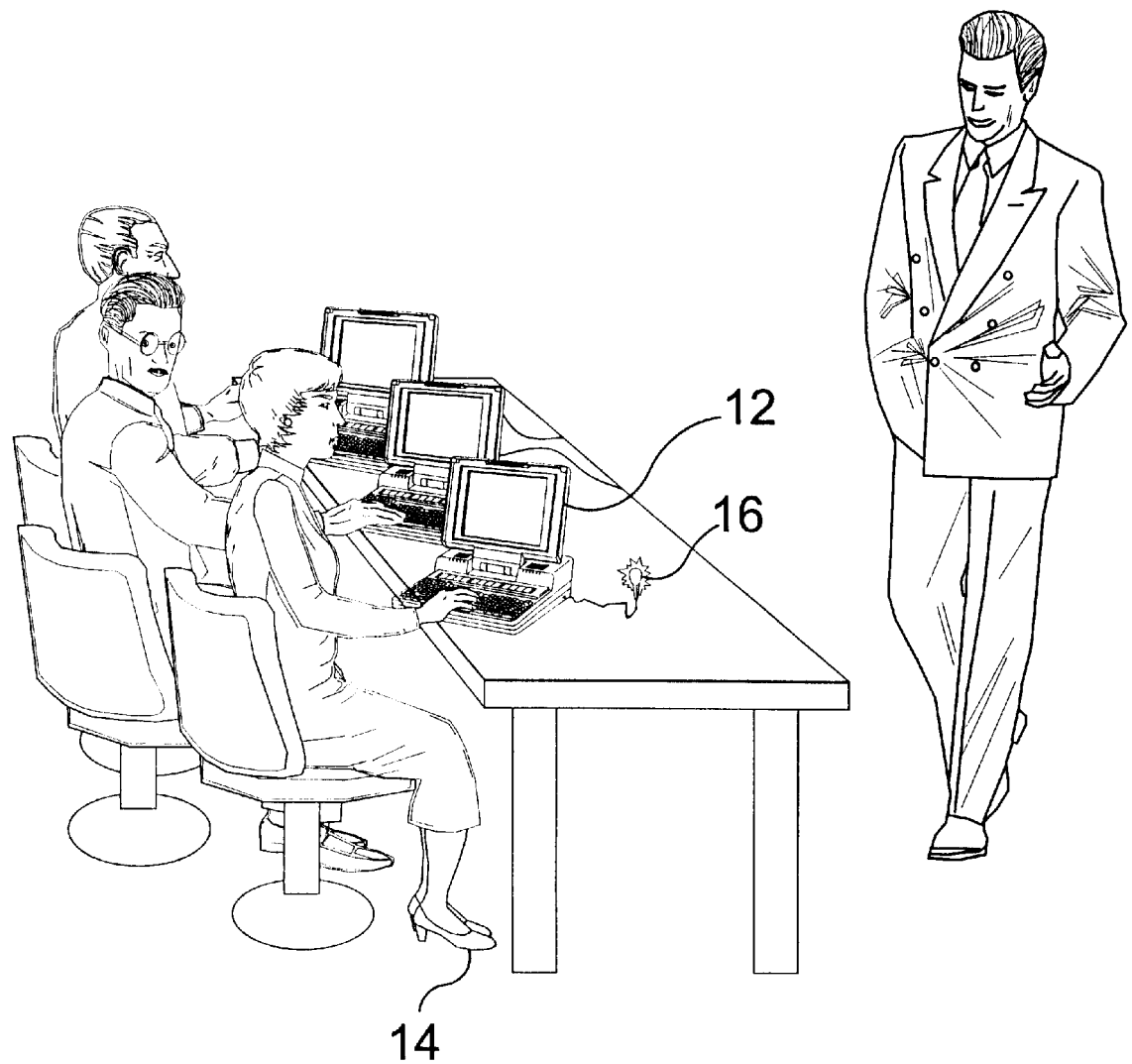
FIG. 2 is a perspective view of the prior art in use.

Turning to FIG. 2, shown therein is a perspective view of prior art in use. Depicted is a participant 14 utilizing a conventional external microphone 16 to record a presentation. In addition to tying up the in-line port on computer 12 to plug in the microphone 16, the setup can often draw unneeded attention and cause disturbance in the presentation.

Figure 3:
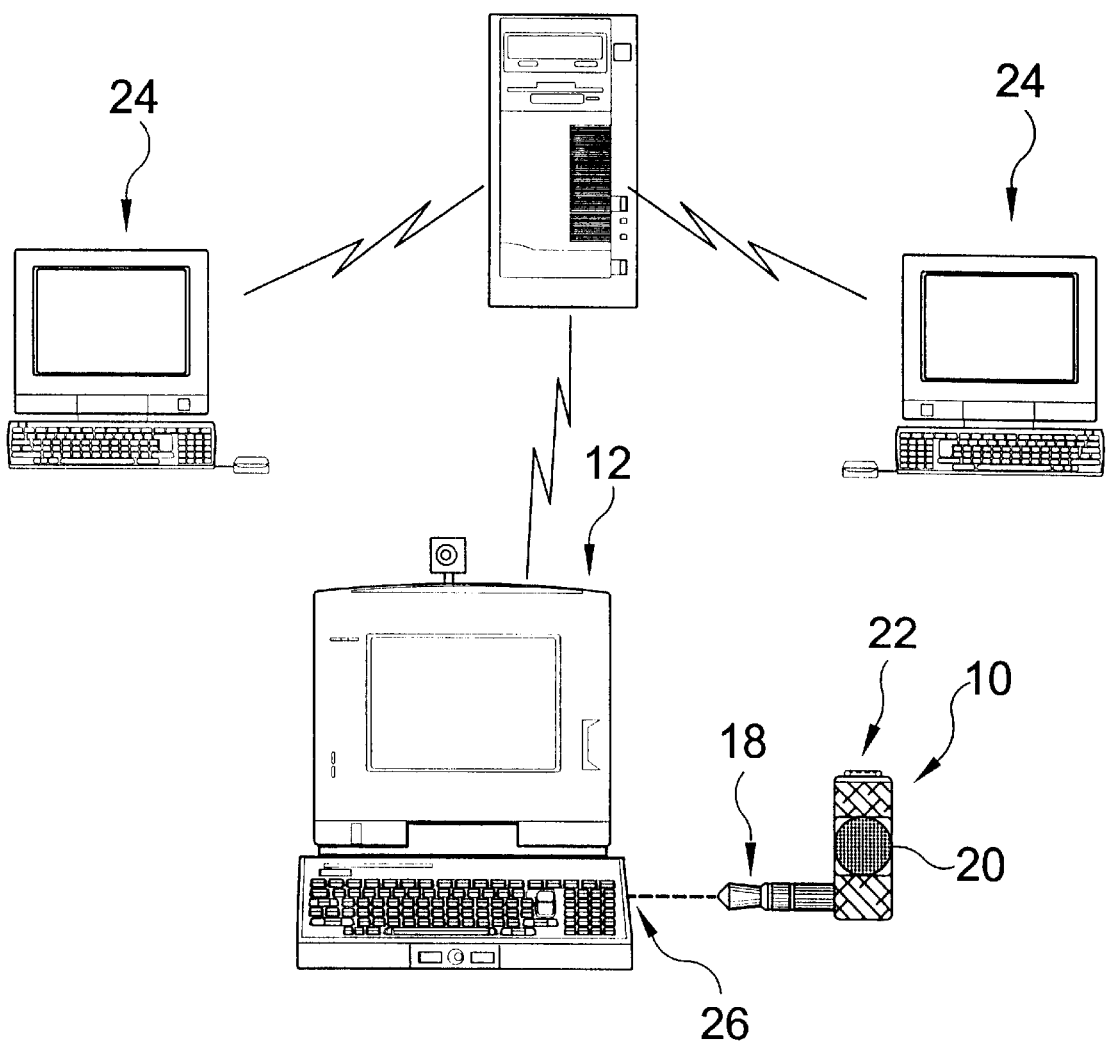
FIG. 3 is an illustrative view of the present invention in use.

Turning to FIG. 3, shown therein is an illustrative view of the present invention 10 in use. Depicted is the present invention 10, a 3.5 mm stereo male connector 18 with microphone 20 and 3.5 mm stereo female connector 22 input, being utilized for video conferencing using remote computer station 24 over the Internet. By utilizing the present invention 10, the user is able to add a microphone 20 to the laptop computer 12 without losing the line-in port 26.

Figure 4:
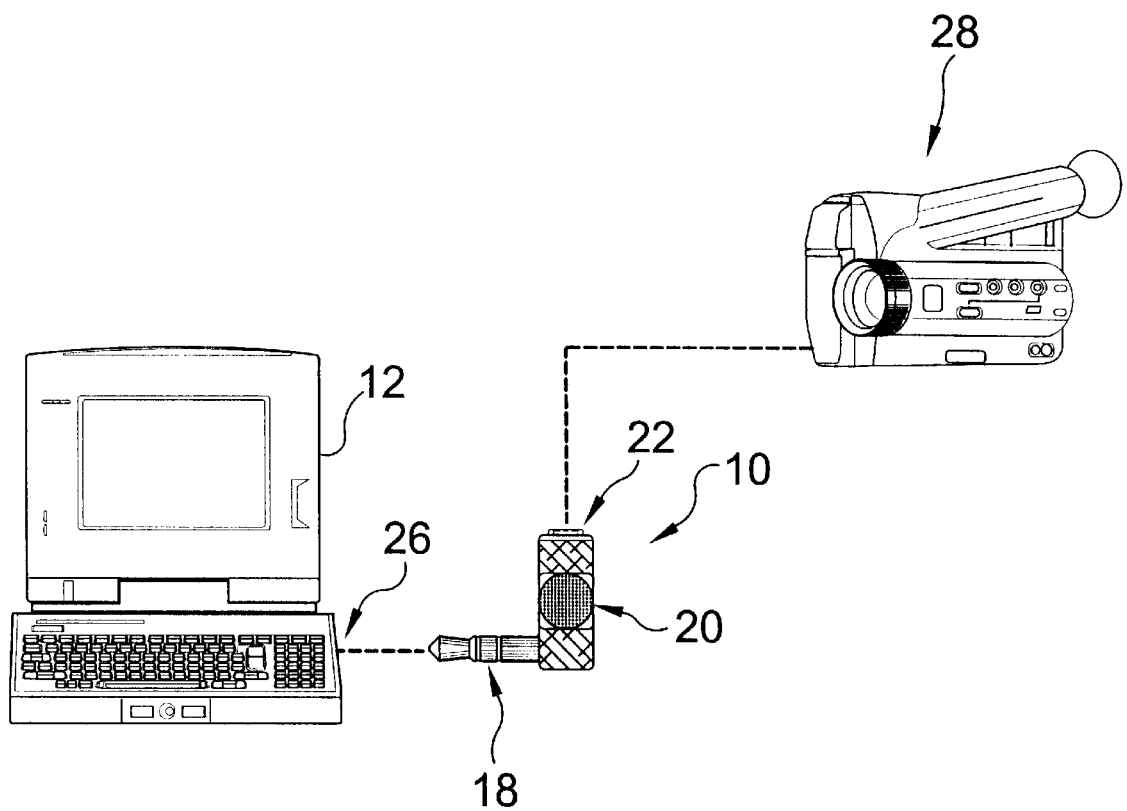
FIG. 4 is an illustrative view of the present invention in use.

Turning to FIG. 4, shown therein is an illustrative view of the present invention 10 in use. Shown is the present invention 10 being utilized to record video and audio. The present invention 10 is a microphone 20 having a male connector 18 that can be interfaced to a computer 12 using the computer's female line-in connection 26. The present invention 10 also has a female connection 22 member providing means for connecting additional equipment 28 to the computer's line-in port 26. The user is able to add a microphone 20 to the laptop computer 12 without losing the line-in port 26. This allows the user a second input to mix in audio over the video being recorded onto the laptop computer 12.

Figure 5:
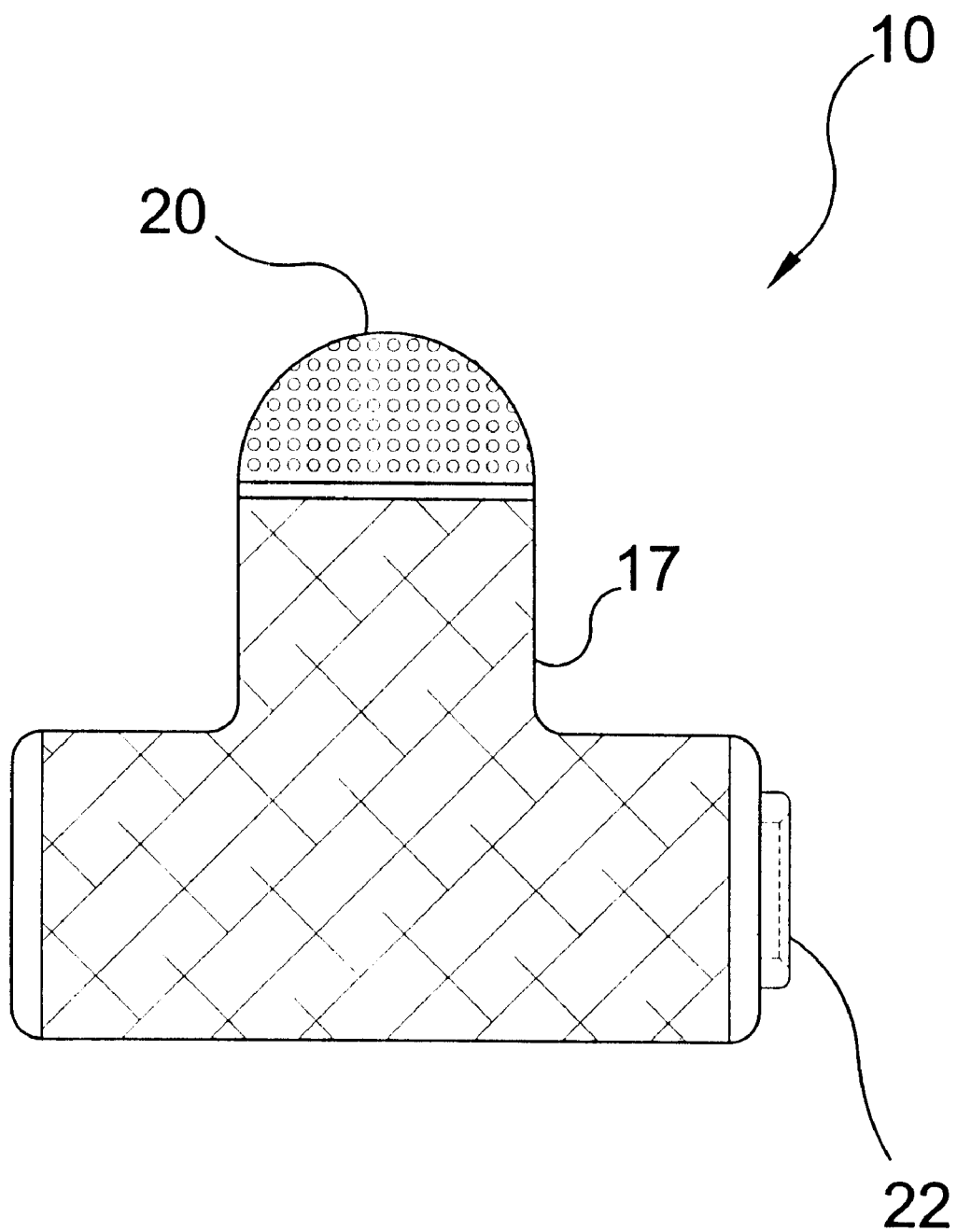
FIG. 5 is a front view of the present invention.

Turning to FIG. 5, shown therein is a front view of the present invention 10. Depicted is the present invention 10 having a body 17 with a 3.5 mm stereo male connector with microphone 20 input and 3.5 mm stereo female connector input 22. By eliminating the extension cord and clip of a conventional microphone, the integral microphone 20 provides user friendly convenience over conventional microphones. By being pivotal about the male connector, the microphone 20 can be rotated 360° for optimal adjustment.

Figure 6:
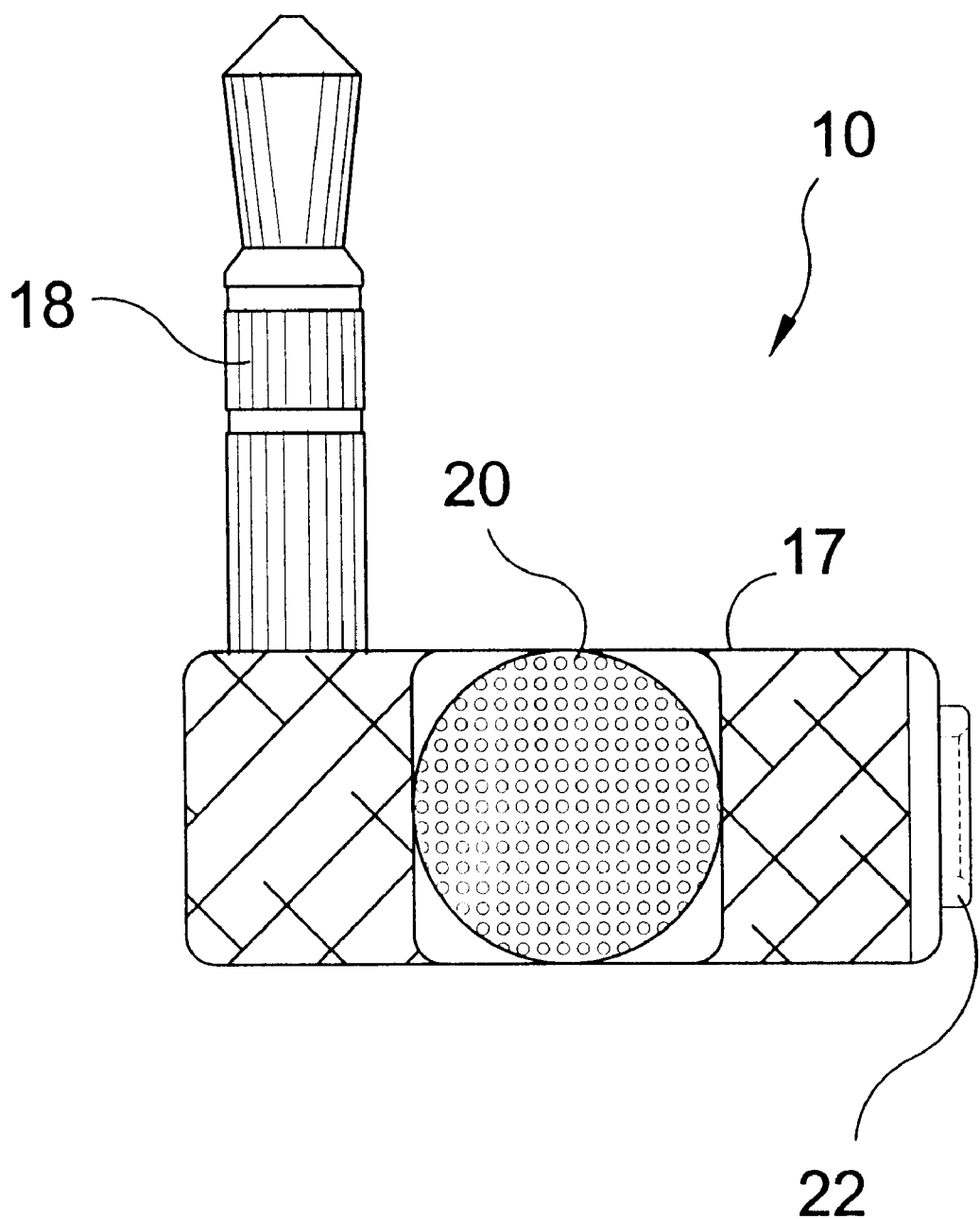
FIG. 6 is a top view of the present invention.

Turning to FIG. 6, shown therein is a top view of the present invention 10. Due to the petite size of the in-line adapter, the user can leave it plugged in the port while not in use. Thus, the integral microphone 20 is ultimately convenient for recording from your laptop or any audio recording device. The body 17 with male 18 and female 22 connectors are also shown.

Figure 7:
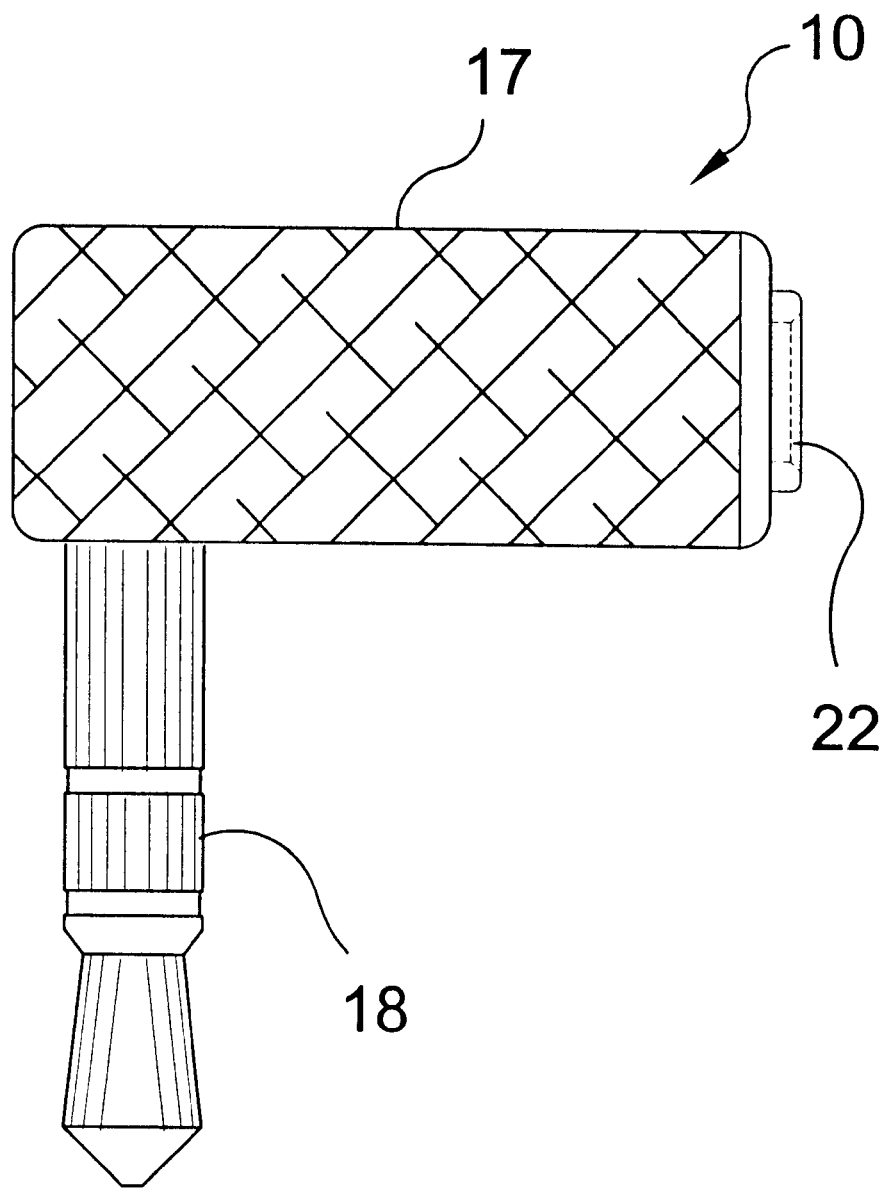
FIG. 7 is a bottom view of the present invention.

Turning to FIG. 7, shown therein is a bottom view of the present invention 10. In addition to having the convenience of an integral microphone, the present invention 10 includes a female connector input 22 with body 17. Thus, when the in-line microphone and male adapter 18 is in use, the user still has access to a line-in port 22 for other devices.

Figure 8:
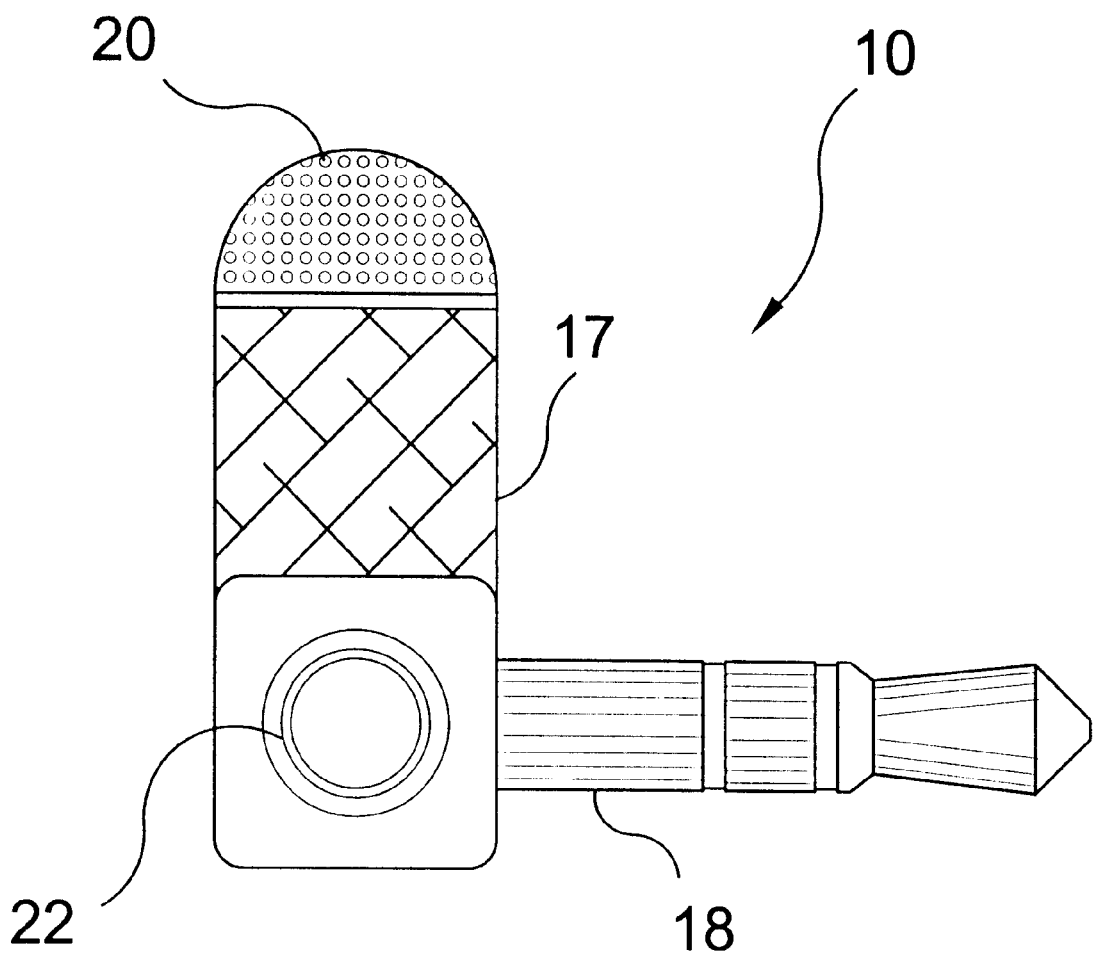
FIG. 8 is a right side view of the present invention.

Turning to FIG. 8, shown therein is a right side view of the present invention 10. By eliminating the extension cord and clip, the integral microphone 20 in body 17 provides the user advantages over conventional microphones. This design of the in-line adapter and microphone 20 provides the user convenience for video conferencing or using the telephone over the Internet. The male 18 and female 22 connectors are also shown.

Figure 9:
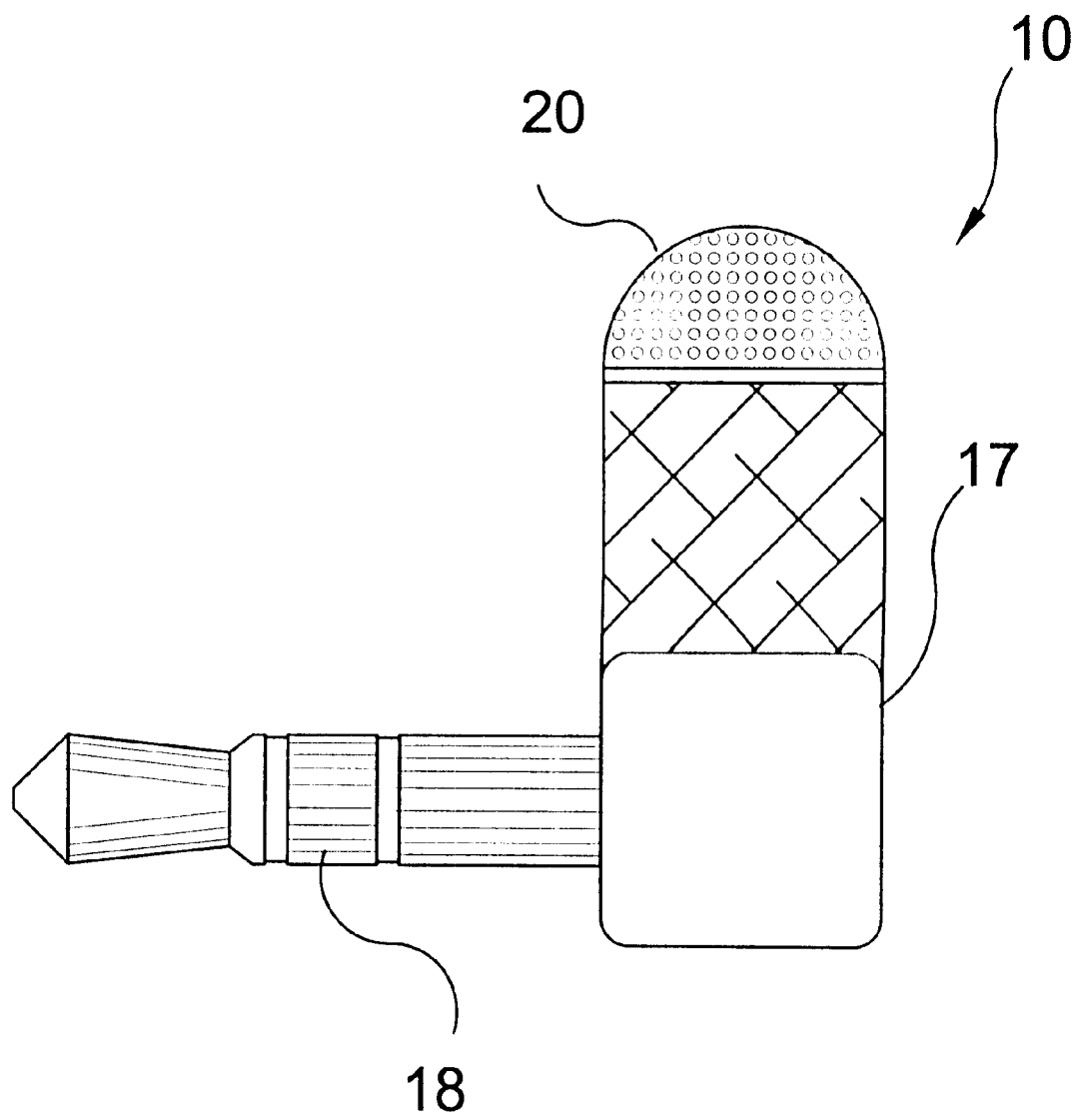
FIG. 9 is a left side view of the present invention.

Turning to FIG. 9, shown therein is a left side view of the present invention 10. The male connector 18 in body 17 is on the opposing end of the female connector input. The male connector 18 is compatible with a 3.5 mm female port typical with laptop computers and other audio recording devices. When the in-line adapter and microphone 20 are in use, the user has full access to other functions and files on the computer.

Figure 10:
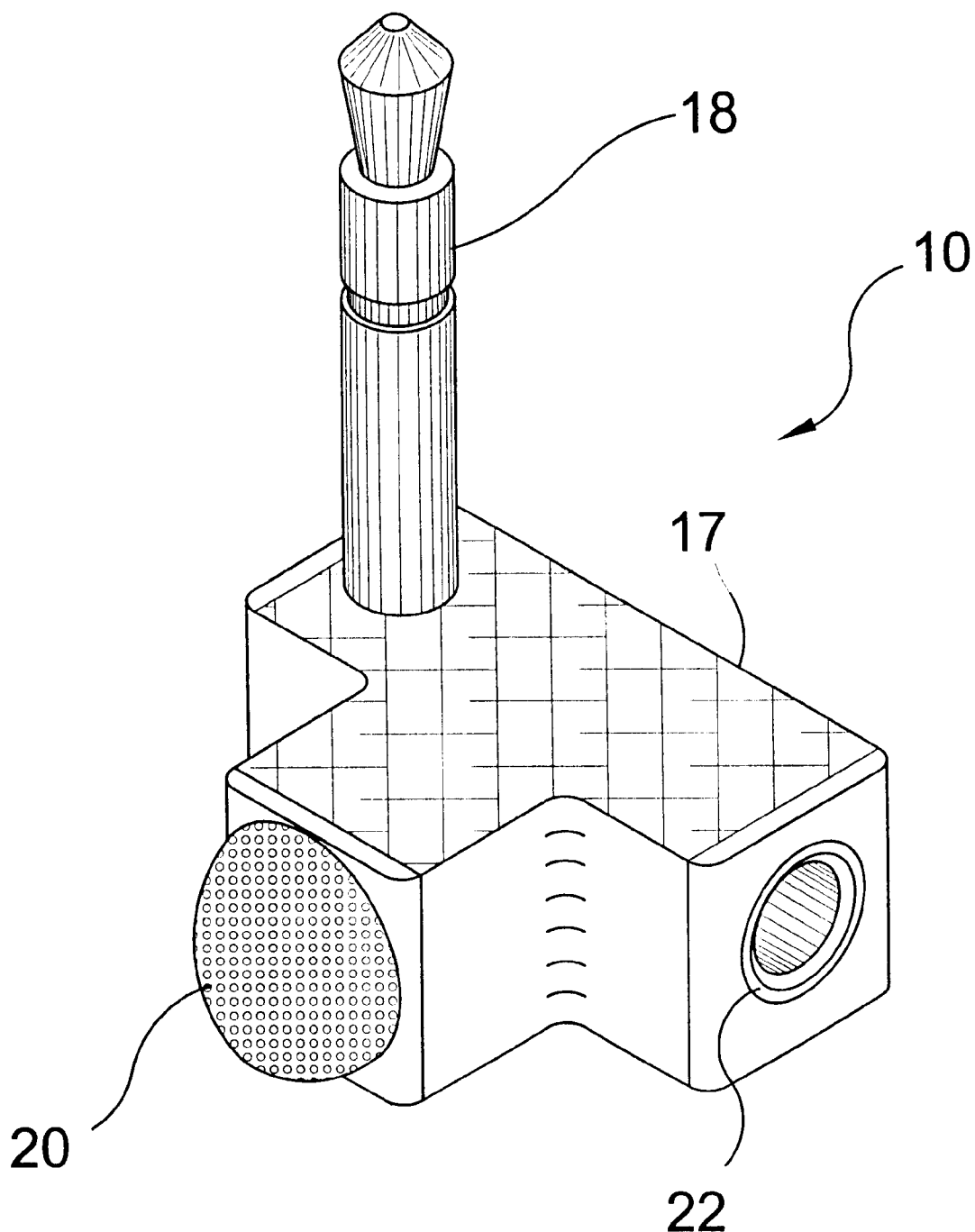
FIG. 10 is an isometric view of the present invention.

Turning to FIG. 10, shown therein is an isometric view of the present invention 10. The integral microphone 20 in body 17 provides user friendly convenience over conventional microphones. By being pivotal upon the male connector, the microphone 20 can be rotated 360° for optimal adjustment. In addition, the user has control adjustments of the microphone 20 without affecting other line-in devices. This includes the ability to mute the microphone 20 and turn the speaker volume down to avoid feedback from the internal speakers. The male 18 and female 22 connectors are also shown.

Figure 11:
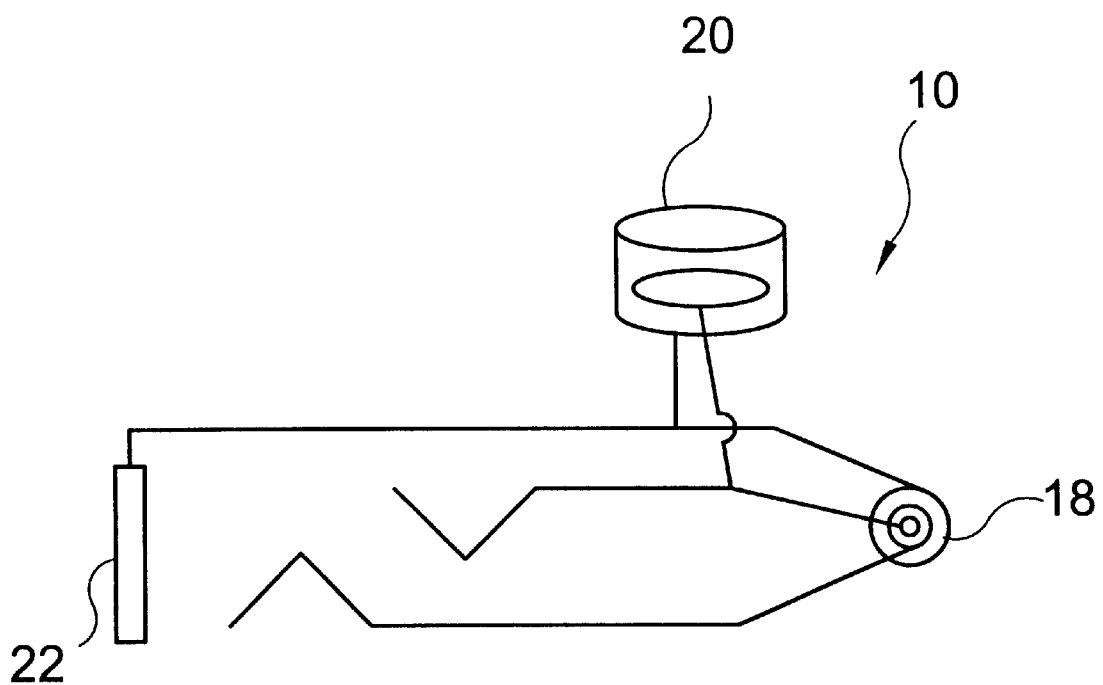
FIG. 11 is a side view schematic diagram of the present invention.

FIG. 11 is a side view schematic diagram of the present invention 10 showing the electrical connection means. Depicted in FIG. 11 is the present invention 10 schematic diagram, a 3.5 mm stereo male connector 18 with microphone 20 input and 3.5 mm stereo female connector input 22.

Figure 12:
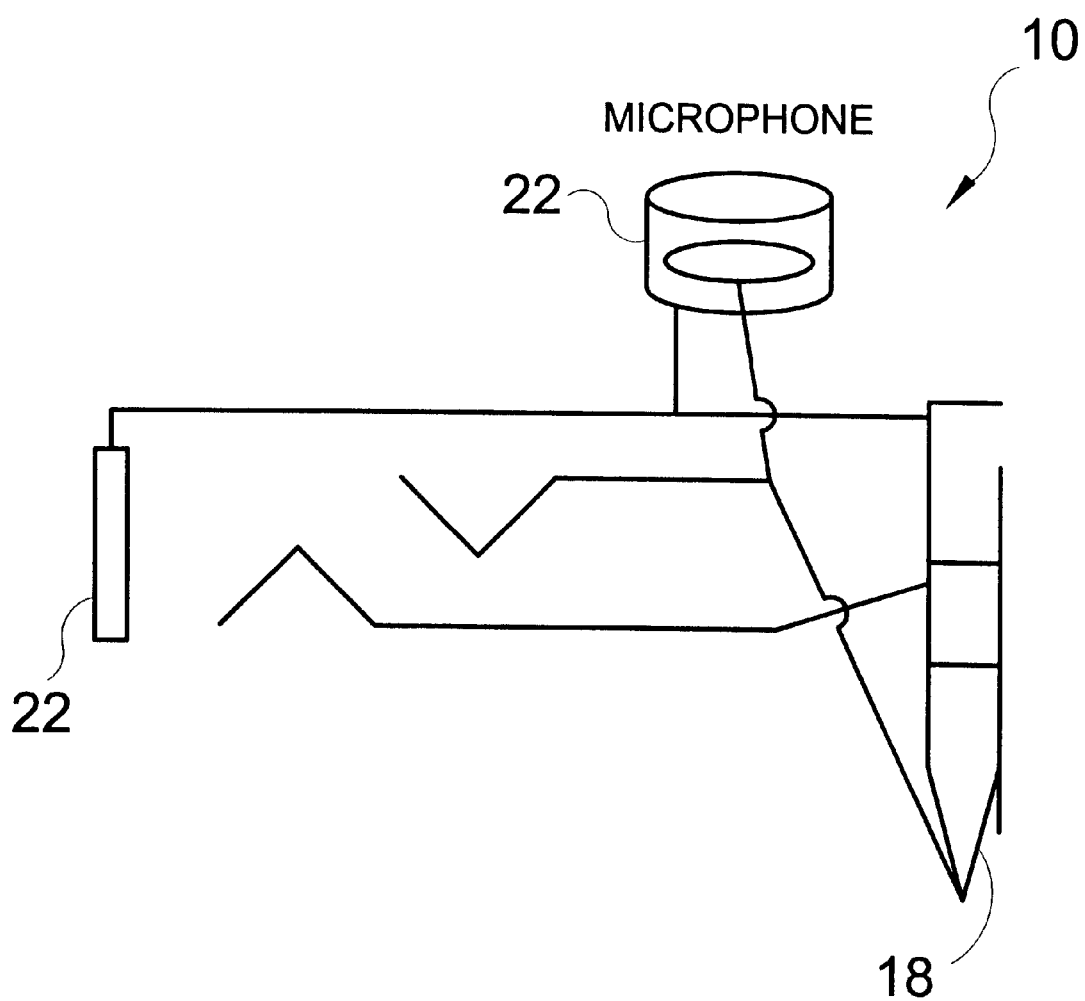
FIG. 12 is a top view schematic diagram of the present invention.

Turning to FIG. 12, shown therein is a top view schematic diagram of the present invention 10 showing the electrical connection means. Depicted in FIG. 12 is the present invention 10 schematic diagram, a 3.5 mm stereo male connector 18 with microphone 20 input and 3.5 mm stereo female connector input 22.

What is claimed to be new and desired to be protected by Letters Patent is set forth in the appended claims:

1. An electrical adapter, comprising:
   a) a body;
   b) a male connector disposed on said body;
   c) a female connector disposed on said body;
   d) a microphone disposed on said body; and,
   e) means for electrically connecting said male connector, said female connector and said microphone disposed internal said body.

2. The apparatus of claim 1, wherein said male connector delivers and input signal to an electrical device.

3. The apparatus of claim 2, wherein said male connector is a phone plug.

4. The apparatus of claim 3, wherein said male connector is a 3.5 mm plug.

5. The apparatus of claim 4, wherein said female connector receives an input signal from an electrical device.

6. The apparatus of claim 5, wherein said female connector is a phone jack.

7. The apparatus of claim 6, wherein said female connector is a 3.5 mm jack.

8. An electrical adapter system, comprising:
   a) a personal computer having an input port disposed thereon;
   b) a body containing an electrical adapter;
   c) a male connector disposed on said body to permit insertion into said input port of said personal computer for physical and electrical connection of said male connector and said personal computer;
   d) a female connector disposed on said body;
   e) a microphone disposed on said body; and,
   f) means for electrically connecting said male connector, said female connector, and said microphone disposed internal said body.

9. The apparatus of claim 8, wherein said male connector is a phone plug.

10. The apparatus of claim 9, wherein said male connector is a 3.5 mm plug.

11. The apparatus of claim 10, wherein said female connector is a phone jack.

12. The apparatus of claim 11, wherein said female connector is a 3.5 mm jack.

* * * * *